(12) United States Patent
Ripper et al.

(10) Patent No.: US 7,497,075 B2
(45) Date of Patent: Mar. 3, 2009

(54) METHOD AND DEVICE FOR STORING AND DOSING A REDUCING AGENT

(75) Inventors: Wolfgang Ripper, Stuttgart (DE); Johannes Schaller, Leonberg (DE); Markus Buerglin, Ditzingen (DE); Thorsten Mayer, Worms (DE); Stefan Fischer, Lichtenfels (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 10/399,649

(22) PCT Filed: Aug. 15, 2002

(86) PCT No.: PCT/DE02/03043

§ 371 (c)(1),
(2), (4) Date: Oct. 7, 2003

(87) PCT Pub. No.: WO03/018177

PCT Pub. Date: Mar. 6, 2003

(65) Prior Publication Data

US 2004/0045284 A1    Mar. 11, 2004

(30) Foreign Application Priority Data

Aug. 18, 2001  (DE)  ................. 101 40 614
Nov. 13, 2001  (DE)  ................. 101 55 675

(51) Int. Cl.
*F01N 3/00* (2006.01)
(52) U.S. Cl. ............... 60/286; 60/274; 60/301; 60/303
(58) Field of Classification Search .......... 60/274, 60/286, 298, 301, 303
See application file for complete search history.

(56) References Cited

U.S. PATENT DOCUMENTS

| 4,312,372 A | * | 1/1982 | Amos et al. ............. 137/266 |
| 6,122,909 A |   | 9/2000 | Andrews et al. |
| 6,387,336 B2 | * | 5/2002 | Marko et al. ............ 423/212 |

FOREIGN PATENT DOCUMENTS

| DE | 297 08 591 | 7/1997 |
| DE | 199 49 296 | 4/2001 |
| EP | 0 381 236 | 8/1990 |
| EP | 1 092 466 | 4/2001 |
| EP | 1199449 | 4/2002 |
| JP | 02 258 017 | 10/1990 |
| JP | 08-203741 | 8/1996 |
| JP | 2001 152 831 | 6/2001 |
| JP | 2001-152831 | * 6/2001 |
| JP | 2001-159308 | * 6/2001 |
| WO | WO 99 01205 | 1/1999 |

OTHER PUBLICATIONS

*Selective Catalytic Reduction*, Dieselnet Technology Guide, Online, Aug. 2000, pp. 1-12.

* cited by examiner

*Primary Examiner*—Thomas E Denion
*Assistant Examiner*—Diem Tran
(74) *Attorney, Agent, or Firm*—Kenyon & Kenyon LLP

(57) ABSTRACT

Apparatus for storing and metering of reducing agents that may be used within the framework of a catalytic exhaust gas aftertreatment, having a device for storing the reducing agent to be metered and a metering device for applying the reducing agent to the exhaust gas to be treated, the device for storing the reducing agent having an outer container and a cartridge, containing the reducing agent, that is able to be exchangeably positioned in it.

15 Claims, 2 Drawing Sheets

METHOD AND DEVICE FOR STORING AND DOSING A REDUCING AGENT

FIELD OF THE INVENTION

The present invention relates to an apparatus and a method for storing and metering a reducing agent. The present invention also relates to a device for storing a reducing agent.

BACKGROUND INFORMATION

As a result of steadily lower applicable pollution limits in recent years, numerous devices and methods have been developed for the aftertreatment of exhaust gases of internal combustion engines. Efficient exhaust gas aftertreatment systems have become available, for instance, using catalytic converter systems which use ammonia-containing reducing agents for the conversion of $NO_x$.

In order to achieve a reduction of Holding attachment components in exhaust gases, reduction catalytic converters have been developed, particularly for Diesel engines. In this respect, the distinction is usually made between so-called SCR systems (in English, selective catalytic reduction) and so-called catalytic converters with hydrocarbon trap. On SCR catalytic converters, the nitrogen oxides react selectively with a reducing agent. The $NO_x$ reduction takes place continuously at the temperature operating range of the catalytic converter. Ammonia is the reducing agent having the highest selectivity. In a motor vehicle, for example, ammonia may be obtained from urea, whereas catalytic converters having a hydrocarbon trap, for example, store $NO_x$ as nitrate, and are periodically regenerated in so-called exhaust gas-rich phases, using hydrocarbons carried along with the fuel of the internal combustion engine.

A system is known from European Published Patent Application No. 0381236 in which, by means of compressed air, a urea-water solution for the removal of nitrogen oxides is metered into the exhaust gases coming from a Diesel engine. However, in this instance, the urea-water solution must first be converted by an additional chemical process into ammonia, whereby the efficiency of the method is made worse, and undesired by-products cannot be excluded.

It is also known within the framework of SCR technology, that one can use ammonia-containing starting materials, such as ammonium carbonate or even ammonia water. However, it is common to all methods that ammonia is not used directly, on account of the difficulty of handling it.

Further disadvantages that show up in using ammonia-containing starting materials are, for instance, relatively low mass-related reducing performance, and possibly a limited usefulness in wintertime, whereby appropriate additional measures become necessary.

Devices and methods for the catalytic reduction of emissions of internal combustion engines are known from U.S. Pat. No. 6,122,909. Among other things, it is mentioned here that, within the framework of SCR methods, ammonia may be added to the exhaust gases so that it may react with nitrogen oxides to form nitrogen and water when a catalytic converter is switched on. However, it should be stated as fact, in this connection, that ammonia is a poisonous gas, and that the use of ammonia in SCR systems is connected with great expenditure.

SUMMARY OF THE INVENTION

For this reason, the present invention attempts to make possible, in the most non-expenditure-related manner, the direct use of ammonia, or other reducing agents that have so far been difficult to handle, within the framework of SCR methods.

Because of the use, now possible because of the present invention, of pure ammonia, for example, as the reducing agent in SCR methods, higher efficiencies are achieved as compared to the usual variants of such methods, by-products are avoided and an increased mass-related reducing performance is realized.

The solution according to the present invention permits a very user-friendly refilling of the reducing agent, and makes possible logistics that are easy to implement.

According to one preferred specific embodiment of the present invention, the ammonia is stocked in exchangeable cartridges. The cartridge has a safety valve which is able to open automatically when the cartridge is inserted into its position in its surrounding and holding container. Providing such a safety valve makes possible a particularly safe insertion and an especially simple exchange of cartridges.

Expediently, the container and/or the cartridge are designed as pressure container and safety container. Typical pressures to be tolerated are up to 60 bar or even higher, so that the provision of appropriate pressure containers ensure the safety of the system.

It further proves expedient to provide a safety closure on the cartridge in addition to the safety valve. This, for example, may be brought into the released state before being mounted in the container, using a manual rotation, another direction of movement also being conceivable. Even an automatic rotation is conceivable, e.g. when the artridge is inserted into the container.

According to one preferred specific embodiment of the device according to the present invention, the container has a cover whereby the cartridge may be fixed in its position inside the container, or rather, may be able to be secured. Such a cover may advantageously be designed to have a recess on its inner side, into which a holding attachment of the cartridge may extend. Thus, when the flap is opened, this makes possible a particularly simple pushing in or pulling out of the cartridge.

It is preferred that the container and/or the cartridge are able to be heated, especially that they may be able to have engine cooling water applied to them. The container may, for example, be designed to have hollow walls into which engine cooling water may be brought. Using this measure, it is possible, for example, to heat the cartridge and its contents to a suitable temperature, such as 60° C., 40° C. or even 0° C., (60° C. is preferred for making constant pressure ratios possible), whereby the transportation of reducing agent, particularly ammonia, is supported between the cartridge and the metering device, at least a part of the reducing agent being convertible into the gaseous state with the aid of heating, so that gaseous metering can be carried out. However, another temperature is conceivable which leads to a positive pressure ratio.

It is preferred if the storage device and the metering device communicate with each other via a line for transporting reducing agent, that can be monitored using a pressure sensor. Metering the reducing agent may be carried out either as liquid metering or gas metering, or even as liquid-gas metering. Using the pressure sensor, an expediently set constant system pressure, such as 1.8 bar, is simply made in a way that is able to be checked. In the case of liquid metering, the reducing agent reaches the metering unit at the pressure prevailing in the cartridge and the container. This is on condition that the metered quantity has to be corrected as a function of the prevailing pressure. A pressure sensor may also be used to monitor this system pressure.

The line connecting the storage device and the metering device to each other expediently has a double wall, and if necessary is filled up using insulating means.

The metering device is also expediently able to have engine cooling water applied to it. In this connection, for example, a metering valve used within the framework of the metering device may be designed to have hollow walls into which cooling water may be brought. Alternatively to this, the metering device may also be designed to have cooling means, with the aid of which excessive heat transmission from the exhaust gas pipe, on which the metering device is expediently positioned, may be compensated for. Expediently, an insulating layer is designed to be between the metering device and the exhaust gas pipe.

It has proven expedient to provide a pressure-reducing valve formed in the outer container or in the cartridge. A pressure-reducing valve is particularly suitable for converting reducing agent stored in liquid form in the cartridge at least partially, especially completely, into the gaseous state.

What has proven particularly advantageous is providing a safety valve in order to prevent the sudden liberation of the entire quantity of ammonia carried in the motor vehicle in liquid and/or gaseous form, which may become life-threatening especially during an accident. Thereby, particularly situations are avoided in which ammonia in concentrated form is carried into the environment, which would lead to dangerous accumulations of poisonous and flammable materials. Additionally, the bursting of the pressure container as a result of exceeding a maximum permissible operating pressure is avoided in a reliable way. Such a pressure increase can, for instance, take place if the container is heated above the permissible operating temperature in case of a fire. In such situations, if the reducing agent is released in good time, in small quantities by way of the safety valve, a supercritical pressure increase is reliably avoided, and bursting of the container is excluded.

According to one preferred specific embodiment of the present invention, ammonia is used as the reducing agent. The use of ammonia within the framework of a catalytic exhaust gas purification proves to be particularly effective. With the use of this method according to the present invention, a safe handling is made available of this material, regarded usually as being too dangerous for mobile applications.

DETAILED DESCRIPTION

Figure 1:
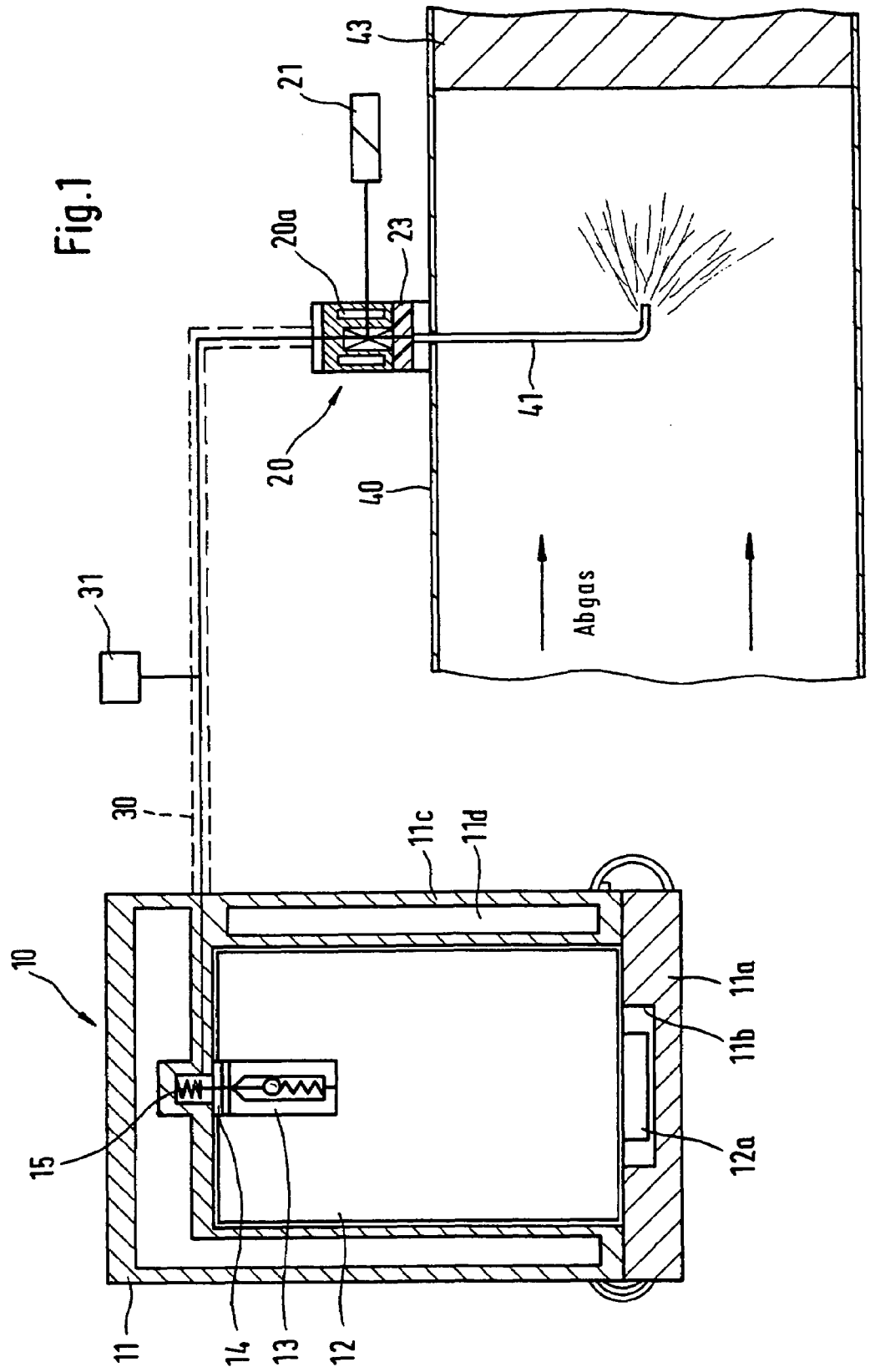
FIG. 1 shows a schematic sectional view of a preferred specific embodiment of the device according to the present invention.

Three components of the device according to the present invention are a storage device for storing the reducing agent used, ammonia in the exemplary embodiment shown, which here are denoted collectively as 10, a metering device for applying the reducing agent used, here denoted as 20, to the exhaust gases to be purified or treated, as well as a pressure line connecting components 10 and 20 to each other, here marked as 30.

Storage unit 10 has an outer heatable safety container 11, and a cartridge 12 that may be introduced into it and exchanged in it. Safety container 11 is designed to have a cover 11a that is able to swivel, by the use of which cartridge 12, when inserted, is able to be positioned and fixed in safety container 11. Cover 1a has a recess 11b, into which, in the locked condition, a holding attachment 12a of cartridge 12 extends, for safety reasons. It is likewise conceivable to use this for the guiding and the axial positioning of the cartridge, by the appropriate forming of the inner wall of the container. With the aid of holding attachment 12a, insertion or extraction of cartridge 12 from safety container 11 is manageable in a simple way.

Safety container 11 is designed to have hollow walls 11c, into whose cavities 11d engine cooling water is able to be brought for heating the cartridge to about 60° C. Cartridge 12 is designed to have a safety valve 13 and a safety closure 14. Before the introduction of the cartridge into safety container 11, the safety closure is, for instance, able to be unfastened manually using a 90° turn. Opening of the safety valve takes place automatically when the cartridge is pushed in into a region of safety container 11 which is designed as pressure-reducing valve 15.

By the opening of safety valve 13, ammonia is able to flow via pressure-reducing valve and pressure line 30 to metering device 20. Metering device 20 is able to be controlled by an appropriate control unit 21. Similar to safety container 11, metering unit 20 may be designed to have hollow walls 20a, so that metering device 20 is able to have cooling water applied to it.

Pressure-reducing valve 15 makes possible the conversion into the gaseous form of the reducing agent which is expediently stored in the cartridge partially in liquid form, whereby gas metering may be implemented in a simple way. The pressure-reducing valve is used for reducing the pressure, the actual conversion from the liquid to the gas phase taking place via concrete pressure changes and temperature changes. For the sake of completeness, one should point out that a gaseous proportion is expediently constantly present in the container. In the case of liquid metering (not shown here), the reducing agent reaches the metering unit without the interposition of a pressure-reducing valve, via the connecting line at the tank pressure and the cartridge pressure.

This requires that the metered quantity has to be corrected as a function of the present pressure. For this purpose, pressure line 30 is expediently able to be monitored using a pressure sensor 31 to monitor the system pressure. It is also possible to hold the system pressure constant via a pressure control. For safety reasons, the pressure line may be designed to have double walls and to be insulated, if necessary.

Metering device 20 is permanently mounted on an exhaust gas pipe 40, through which the exhaust gas flows that is to be treated. The metering device may also be mounted on the frame and have a short metering line that extends into the exhaust gas pipe. This makes it possible to prevent thermal stresses. Reducing agent metered by the metering device is introduced into the exhaust gas in gaseous form via an injection nozzle pipe 41.

The metering unit is expediently made up of one or more metering valves, which may be cooled, if necessary, by engine cooling water, and may be decoupled from the heat of the exhaust gas pipe by an insulating flange or an intermediate pipe.

If necessary, the use of several metering valves and injection nozzle pipes is possible to improve the thorough mixing of reducing agent, particularly ammonia, with exhaust gas.

An insulation 23 is expediently provided between metering valve 20 and exhaust gas pipe 40, so as to insulate the metering valve from the exhaust gas heat.

It will be seen that the exhaust gas, having had the introduced reducing agent, here ammonia, applied to it, is supplied to a catalytic converter 43, where catalytic exhaust gas treatment known per se may be carried out. A substantial advantage in using the device according to the present invention and in carrying out the method according to the present invention is that it requires a reduced number of system components. The device according to the present invention permits a user-friendly filling up of the reducing agent, so that the logistics for making available the ammonia are implemented in a simple manner. The device according to the present invention can be used for passenger cars as well as Nkw's. It offers an improved suitability to winter conditions. Furthermore, no by-products are created during ammonia production. One need not fear any functional disturbances on account of reducing agent precipitations.

The storage device according to the present invention is designed as a system made up of a cartridge and a safety container. The safety container may be designed to be pressure-proof so as to further increase safety. The safety container, as was indicated before, may be made in heated or unheated form, engine cooling water being preferably used for heating. In this context, the temperature prevailing in the cartridge and the container may additionally be regulated.

The exchange of the cartridges is carried out in that cover 11*a*, which is expediently designed as a quick-change cover, is opened, and, using a grip, (the cartridge) is released from its locked position by rotating it, and pulled out. It is also conceivable that the cartridge may be clicked into place, using a suitable mechanism, and released by a longitudinal motion. While the cartridge is being pulled out, safety valve 13 closes. Subsequently, an exchange cartridge may be pushed in and locked, safety valve 13 being automatically opened again during the pushing-in process.

With respect to the ammonia example, in conclusion, let us describe various storage possibilities. When liquid ammonia is made available having a proportion as gas, the pressure prevailing in the cartridge corresponds to the vapor pressure which is a function of the temperature prevailing in the cartridge. Typical pressure ranges are 1.9 bar at −20° C. through 26.1 bar at +60° C.

As an additional measure, it is possible to heat the cartridge or storage device to +60° C., for instance, using engine cooling water. Using this measure, it is possible to set the pressure prevailing in the cartridge or the storage device to be constant, for instance, at 26.1 bar.

In the case of storing liquid ammonia not having a proportion as gas, preferably a diaphragm-type accumulator tank is used as the cartridge. In this context, the cartridge pressure is greater than the vapor pressure; as an example, at a system pressure of 46 bar, the ammonia is maintained in the liquid phase up to a temperature of 85° C.

Figure 2:
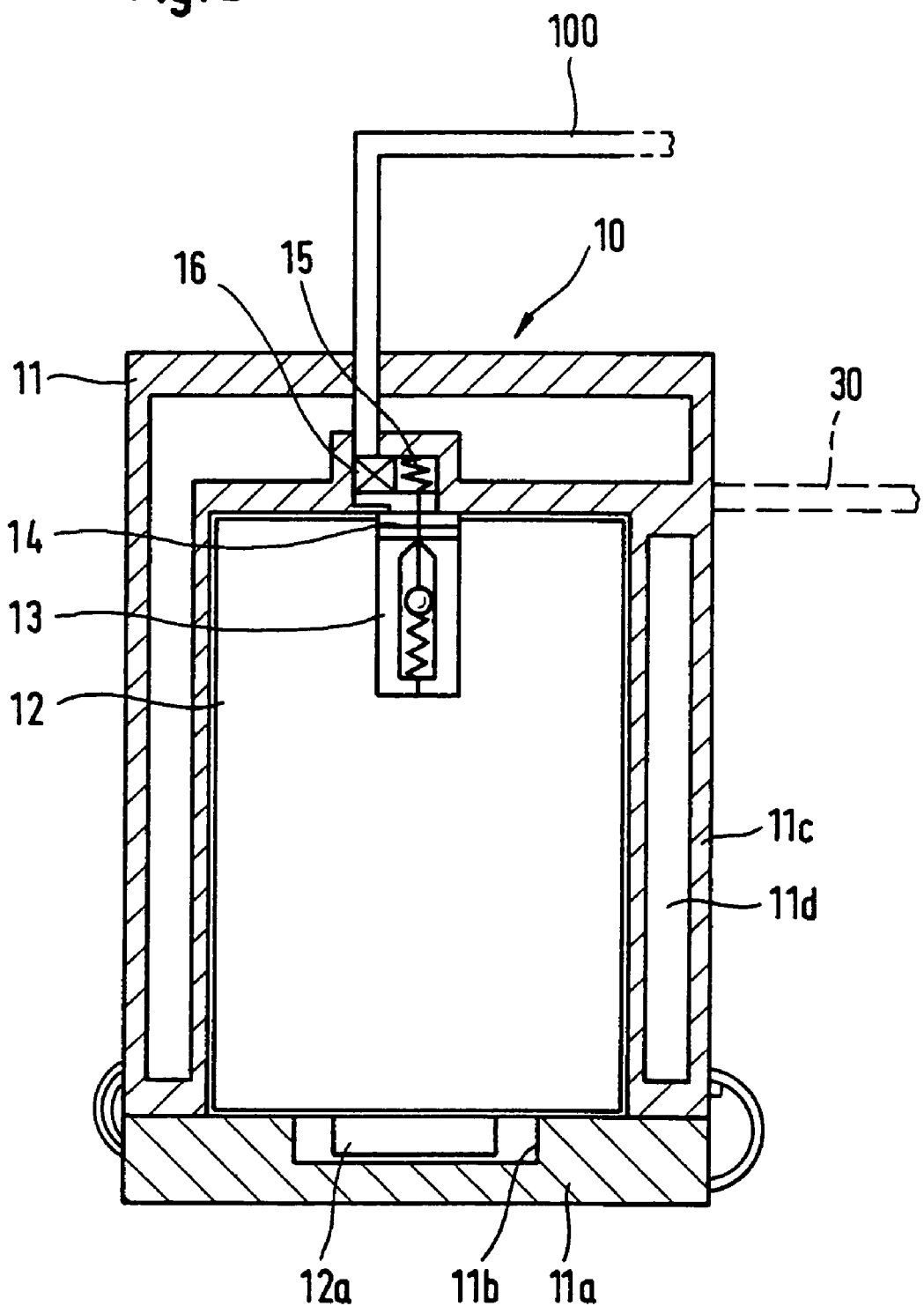
FIG. 2 shows an alternative specific embodiment of the present invention.

FIG. 2 shows an alternative specific embodiment of storage device 10. The same components as in the device illustrated in FIG. 1 are furnished with the same reference numerals and are not described again. The storage device has a safety valve or rather a (high-pressure) relief valve 16. This relief valve 16 is integrated into safety container 11. It is situated next to pressure-reducing valve 15, and, in parallel with the latter, is connected to safety closure 14. On the side facing away from the safety closure, valve 16 is connected to a line 100, which opens out into exhaust gas line 40 upstream of catalytic converter 43 (the connection of line 100 to exhaust gas line 40 is not shown in FIG. 2).

Relief valve 16 opens when the internal pressure of the cartridge exceeds the maximum operating pressure of the cartridge, for instance, on account of an outer heating effect. The ammonia flowing out is then guided into the exhaust gas flow, where it can burn at least partially in the region of the catalytic converter. Thereby, the bursting of the cartridge and the safety container as a result of an exceeding of the maximum operating pressure may be excluded. The potential danger related to the ammonia blown out by the relief valve is low in comparison to the bursting of the container, since the pressure storage content is only emptied gradually and thus a higher dilution of the $NH_3$ with the surrounding air can take place.

Instead of being integrated into the safety container, relief valve 16 may also be integrated into the cartridge itself. Alternatively, two or more connected safety containers each having one cartridge may be provided, which are in optimum fashion each provided with a relief valve 16. The associated lines 100 can open out, in this case, separately or via a collective line into exhaust gas line 40. Alternatively, lines 100 may also simply end in the open, so that excess ammonia is let out on the road, so as to avoid an emergency situation.

What is claimed is:

1. An apparatus for storing and metering a reducing agent for use within a framework of a catalytic exhaust gas aftertreatment, comprising:
   a device for storing the reducing agent to be dispensed, the device for storing the reducing agent including at least one outer container and a cartridge that is adapted to be exchangeably positioned in the at least one outer container, wherein the cartridge is for containing the reducing agent; and
   a metering device for applying the reducing agent to an exhaust gas to be treated, wherein the cartridge has a safety valve that is automatically opened upon introduction of the cartridge into a position in the container, the cartridge adapted to store the reducing agent at least partially in liquid form.

2. The apparatus as recited in claim 1, wherein:
   at least one of the at least one outer container and the cartridge is designed to be a pressure and safety container.

3. The apparatus as recited in claim 1, further comprising:
   a safety closure provided on the cartridge.

4. The apparatus as recited in claim 1, wherein:
   the at least one outer container includes a cover by which the cartridge is able to be secured to its position inside the at least one outer container.

5. The apparatus as recited in claim 1, wherein:
   at least one of the at least one outer container and the cartridge is able to be heated.

6. The apparatus as recited in claim 1, wherein:
   at least one of the at least one outer container and the cartridge is able to have engine cooling water applied thereto.

7. The apparatus as recited in claim 1, further comprising:
   a line for transporting the reducing agent and via which the device for storing the reducing agent and the metering device communicate with each other; and
   a pressure sensor for monitoring the line.

8. The apparatus as recited in claim 1, wherein:
   the metering unit is able to have applied thereto one of engine cooling water and another cooling medium.

9. The apparatus as recited in claim 8, wherein:
   the other cooling medium includes Diesel fuel.

10. The apparatus as recited in claim 1, further comprising:
    a pressure-reducing valve provided one of in the at least one outer container and on the cartridge.

11. The apparatus as recited in claim 1, wherein:

at least one pressure relief valve is integrated into the device for storing the reducing agent.

12. The apparatus as recited in claim 11, wherein:

the at least one pressure relief valve is integrated into the at least one outer container.

13. The apparatus as recited in claim 12, further comprising:

a line, wherein the cartridge is able to be connected to the line via the at least one pressure relief valve for removing excess reducing agent, when a maximum permissible operating pressure of the cartridge is exceeded.

14. A method for storing and metering a reducing agent usable within a framework of a catalytic exhaust gas aftertreatment, comprising:

operating an apparatus that includes:

a device for storing the reducing agent to be metered, the device for storing the reducing agent including at least one outer container and a cartridge that is adapted to be exchangeably positioned in the at least one outer container, wherein the cartridge contains the reducing agent, and a metering device for applying the reducing agent to an exhaust gas to be treated wherein the cartridge has a safety valve that is automatically opened upon introduction of the cartridge into a position in the container, the cartridge adapted to store the reducing agent at least partially in liquid form.

15. The method as recited in claim 14, wherein:

ammonia injected directly into the exhaust gas to be treated is used as the reducing agent.

* * * * *